H. H. EATON.
NAIL MAKING MACHINE.
APPLICATION FILED JULY 16, 1913.
1,285,077.
Patented Nov. 19, 1918.
6 SHEETS—SHEET 5.
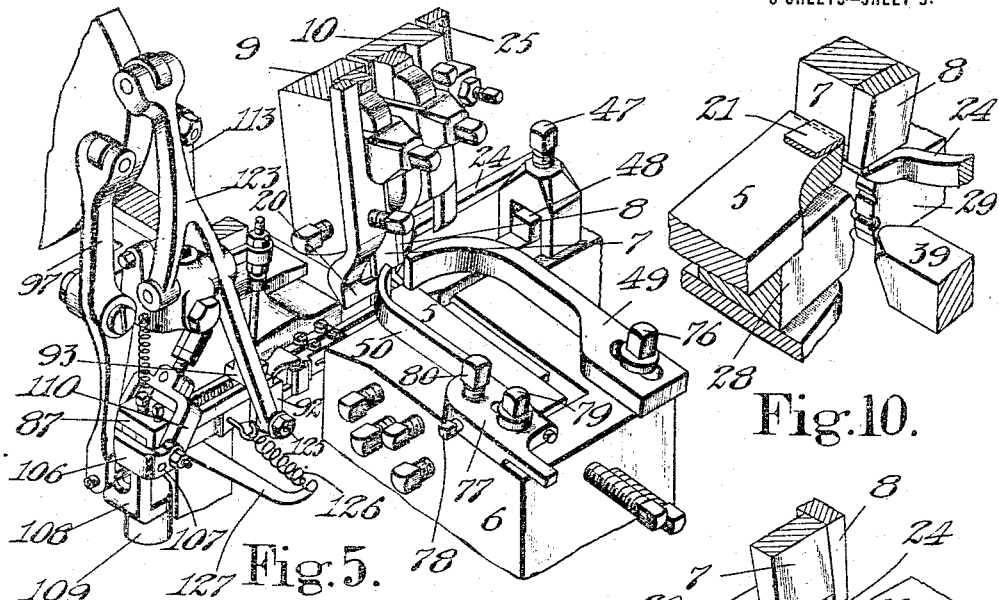
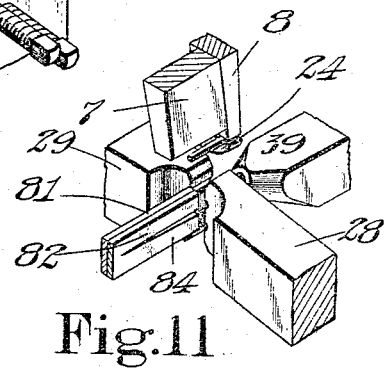
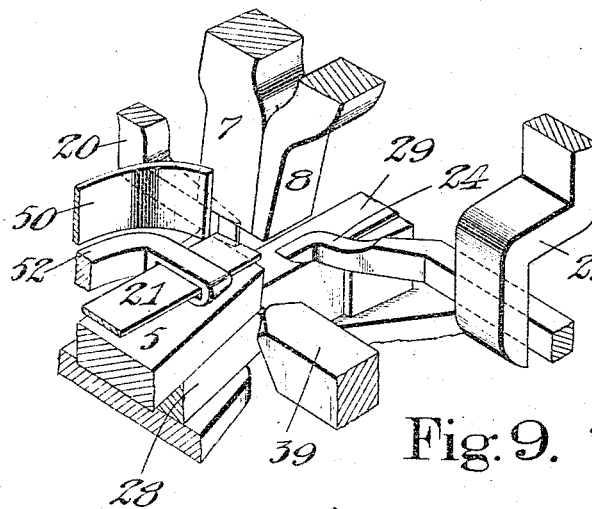
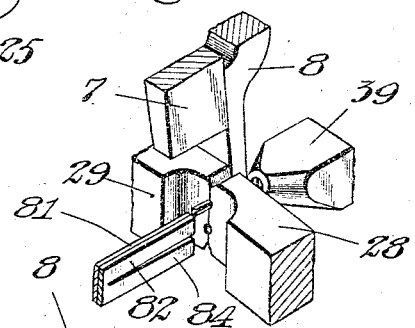
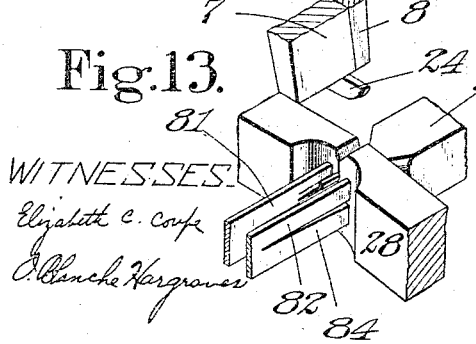
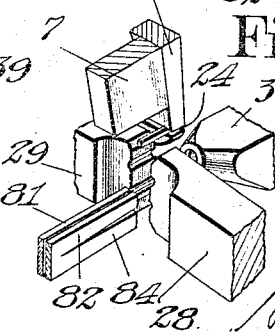

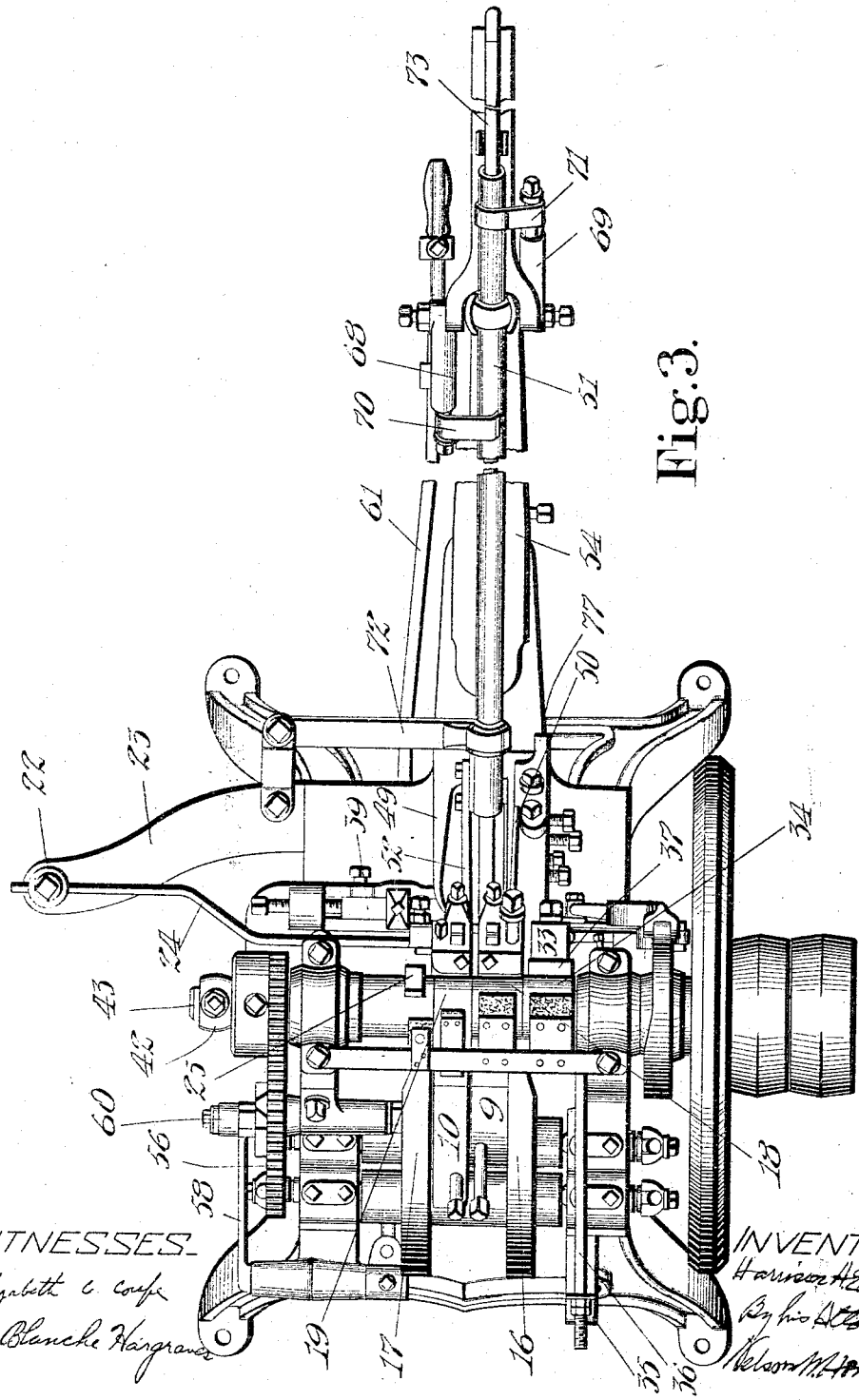

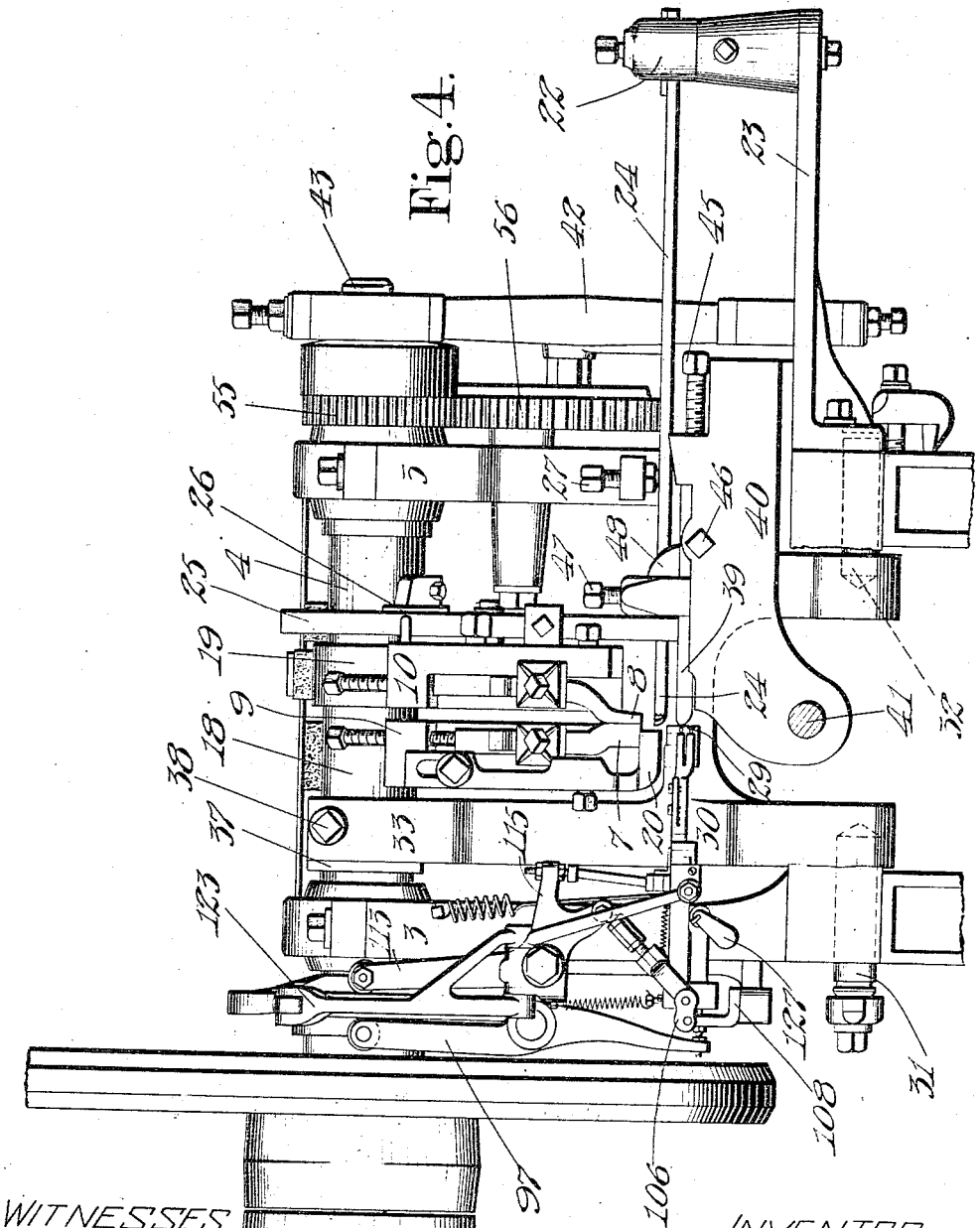

H. H. EATON.
NAIL MAKING MACHINE.
APPLICATION FILED JULY 16, 1913.
1,285,077.
Patented Nov. 19, 1918.
6 SHEETS—SHEET 6.
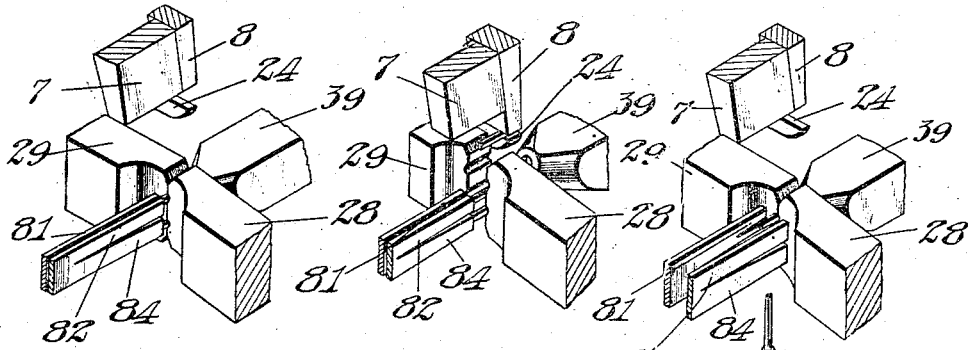
Fig. 15.   Fig. 16.   Fig. 17.
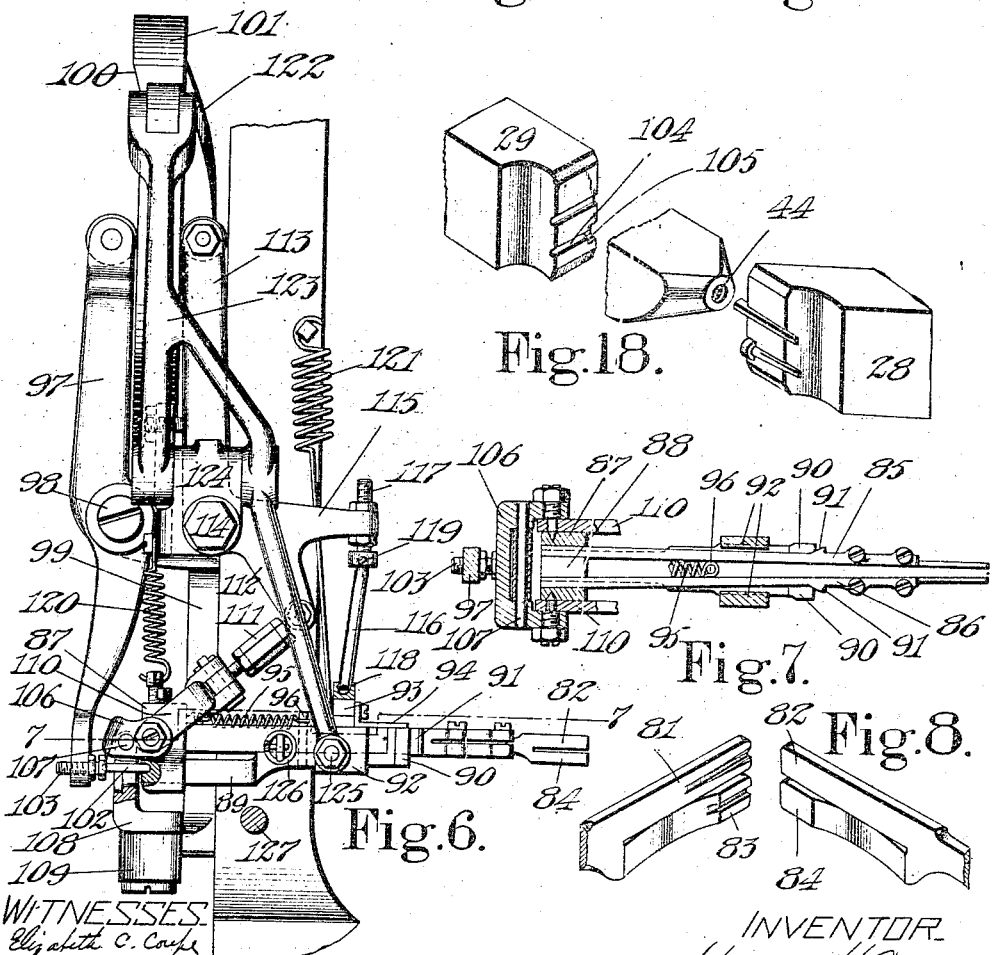
Fig. 18.
Fig. 6.   Fig. 7.   Fig. 8.
WITNESSES
INVENTOR

UNITED STATES PATENT OFFICE.

HARRISON H. EATON, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

NAIL-MAKING MACHINE.

1,285,077.      Specification of Letters Patent.      Patented Nov. 19, 1918.

Application filed July 16, 1913. Serial No. 779,352.

*To all whom it may concern:*

Be it known that I, HARRISON H. EATON, a citizen of the United States, residing at Beverly, in the county of Essex and State of Massachusetts, have invented certain Improvements in Nail-Making Machines, of which the following description, in connection with the accompanying drawings, is a specification, like reference characters on the drawings indicating like parts in the several figures.

This invention relates to machines for making nails, and an object is to provide an improved machine of this character which will produce nails that are more durable, more nicely finished and more uniform in shape and size than machines as constructed heretofore, at the same time involving less waste of material and less wear upon the operative parts of the machine.

In a more particular aspect this invention relates to means for finishing the nail as an operation subsequent to that of swaging a head upon the blank. The head thus formed in the swaging operation is usually wider than desired and is rough and irregular on the side edges. For the purpose of giving the nail its final shape it has been customary to force the head through an aperture in a trimming die, thus shearing away the surplus material at the sides of the head. This operation involves the waste of considerable material and leaves the nail with an upstanding fin on the head which is not easily removed by rumbling. It has been found very difficult also to center the nail properly in the trimming die, and since, furthermore, this type of die is subject to rapid wear and requires frequent grinding, this operation fails to produce nails that are uniform in shape and size.

With the object of avoiding these difficulties and defects this invention provides means for finishing the nail head after the head has been swaged or otherwise formed on the nail by compressing it to reduce it to the shape and size desired together with means for moving the nail out of operative relation to the head forming means and into operative relation to the finishing means. In the preferred embodiment a pair of die blocks having suitably shaped complementary recesses are closed about the sides of the head and adjacent portions of the shank and thereby compress the head to the predetermined size and shape. This operation tends to solidify and harden the head and thus make it more durable, while eliminating all waste of material, and produces a head that is smooth and accurately centered with reference to the shank. By this means no fin is left upon the head end of the nail, and any slight fin that may be left upon the sides of the head where the die blocks meet is easily removed by rumbling. The die blocks used in this operation, also, do not wear so rapidly nor require so frequent grinding as the old form of trimming die. This contributes materially to uniformity of product.

In another aspect an object of this invention is to effect improvements in a type of machine such as disclosed in United States Patent No. 1,072,465, granted to John Hyslop, Sept. 9, 1913. In this type of machine a blank is cut from a strip of material, a head is swaged upon one end of the blank, and the head is finished automatically by an operation subsequent to the heading operation before the nail is discharged from the machine, as distinguished from the previous practice of heading the nail in one machine and finishing the head in another separate machine. In the preferred embodiment of my invention the heading and finishing operations are performed automatically in the same machine, and the latter operation is effected in the improved manner and by the improved means above pointed out. To carry the nail to the finishing or compressing die after the heading operation I employ means suitably constructed and operated to grasp the nail and present it in accurate relation to the finishing die, such means also operating preferably to remove the nail from that die after the finishing operation.

These and other features of the invention, together with certain details of construction and combinations of parts, will now be described with reference to the accompanying drawings which disclose a preferred embodiment of the invention, and will be pointed out in the claims.

In the drawings,

Fig. 3 is a plan view.

Fig. 4 is an enlarged view in elevation of a portion of the machine as seen from the right hand side of Fig. 1, certain parts being broken away for the sake of clearness.

Fig. 5 is a perspective view, in detail, of portions of the machine intimately associated with the nail blank and nail in the cutting, heading and finishing operations.

Fig. 6 is an enlarged view showing in the same manner as Fig. 4 but in greater detail the mechanism for carrying the nail from the heading die to the finishing die and for removing the finished nail from the machine.

Fig. 7 is a plan view, partly in section on the line 7—7 of Fig. 6, showing the carrying fingers and their operating connections.

Fig. 8 shows in detail the opposed inner faces of the fingers.

Fig. 9 illustrates the dies and the heading punch, with mechanism about to sever a nail blank and convey it to the first or heading die.

Figs. 10 and 11 show respectively from different sides portions of the mechanism shown in Fig. 9 at a succeeding stage of the operation with a nail blank in process of removal to the heading die.

Figure 1:
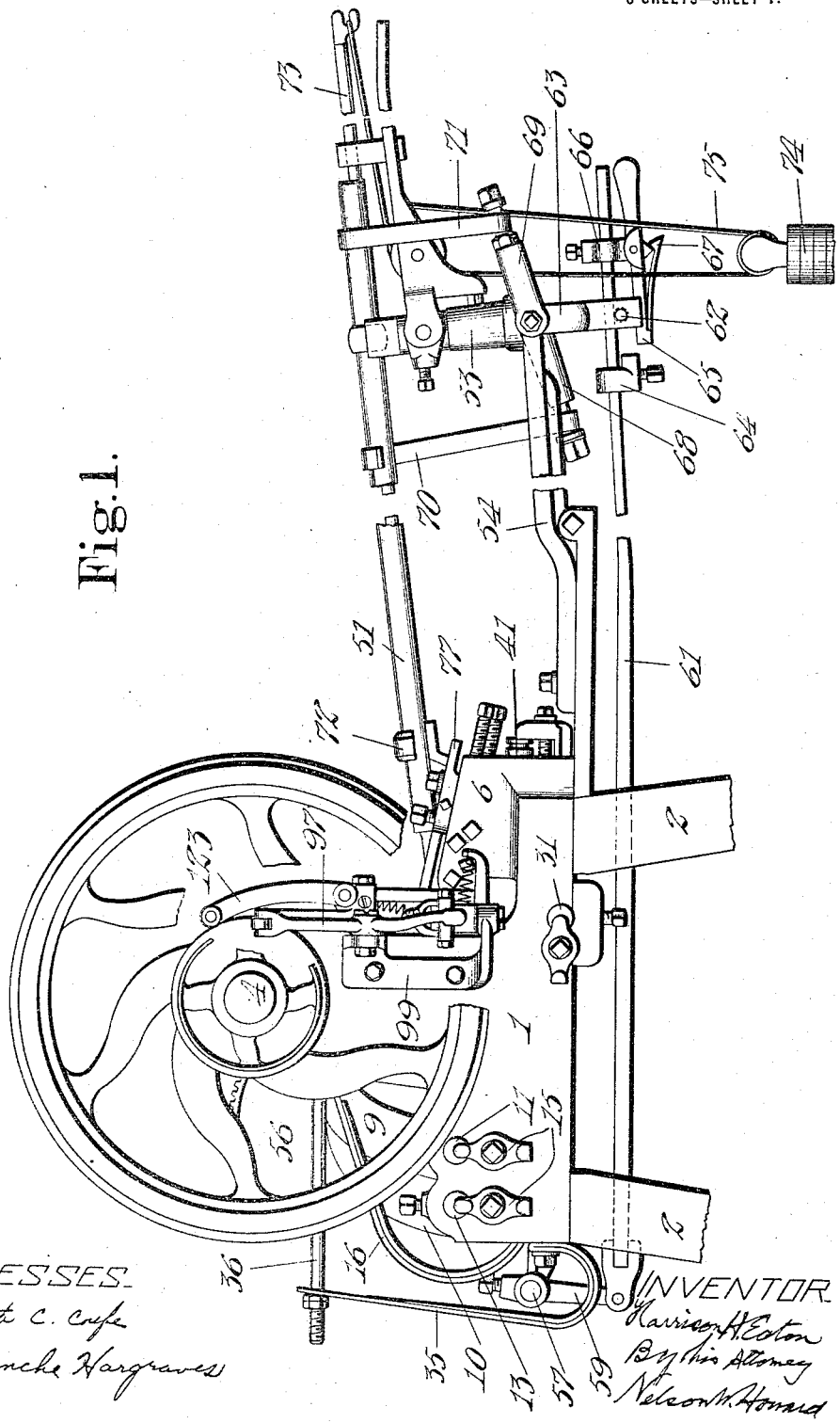
Figure 1 is a view in elevation of one side of a machine in which the invention is embodied.
Figure 2:
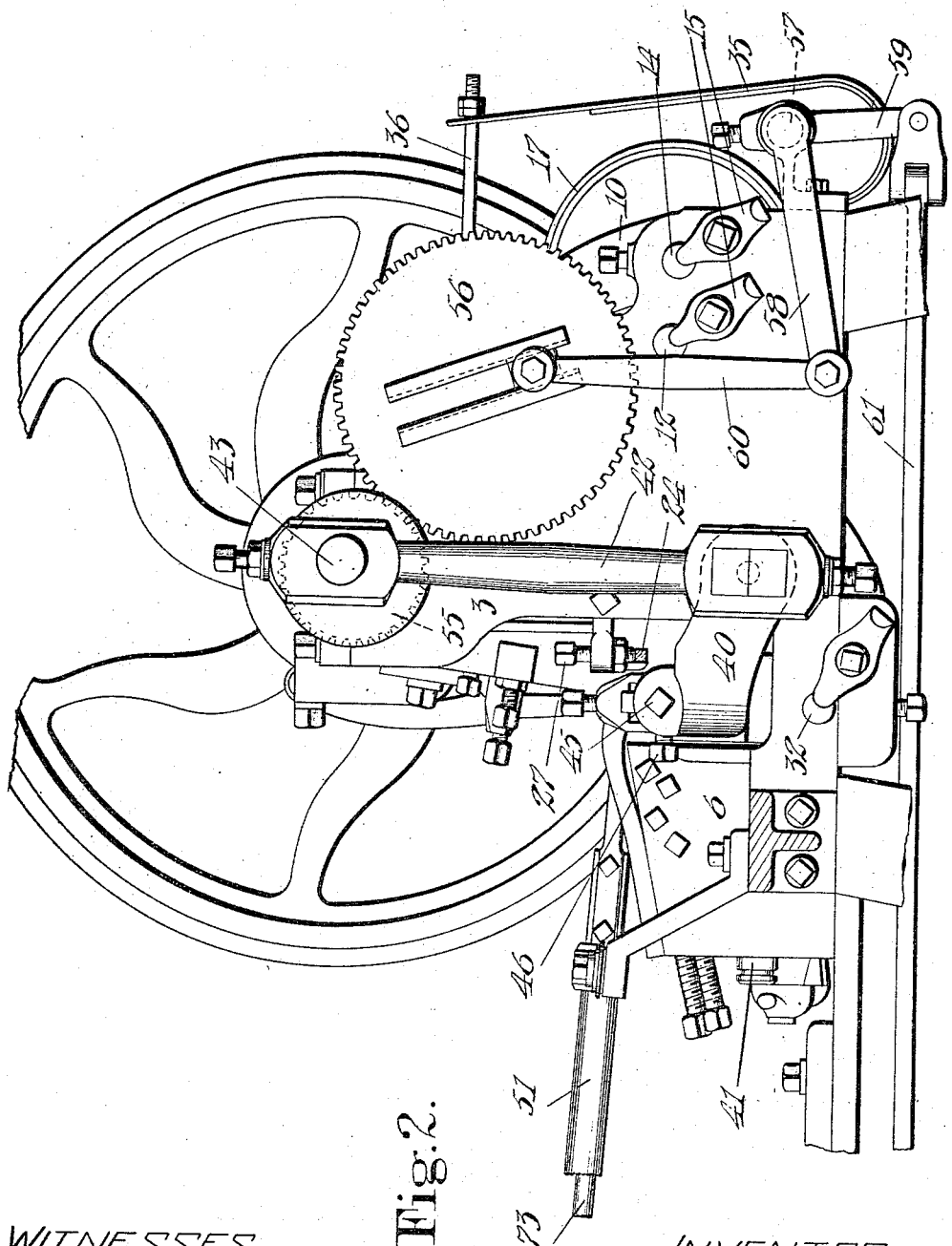
Fig. 2 is an enlarged view of a portion of the opposite side of the machine.

Figs. 12 to 17 inclusive illustrate successive stages of the operation following that shown in Figs. 10 and 11.

Fig. 18 is a perspective view showing the heading punch and the inner face portions of the die blocks, with the movable die block displaced, and illustrates the operative relation of the respective dies to a nail blank and a nail.

The machine includes a frame 1 supported upon standards 2 and formed with upwardly extending portions 3 in which are bearings for the main shaft 4. The machine is designed to cut nail blanks from a strip of metal which is fed automatically as will be hereinafter described, and includes a lower stationary cutting tool or shearing member 5, Fig. 5, which is mounted adjustably in a forward portion 6 of the frame. Coöperating with the tool 5 are movable cutting tools 7 and 8 mounted adjustably in blocks or holders 9 and 10 which rock about pivots or studs 11, 12 and 13, 14 respectively at the rear portion of the frame. The pivots engage the respective blocks on opposite sides and may be adjusted endwise in the frame by means of clamping members 15 so as to effect lateral adjustment of the holders and the cutting tools. Springs 16 and 17 are connected respectively with the blocks 9 and 10 and serve to hold them upwardly with their forward portions in contact respectively with cams 18 and 19 on the shaft 4. The holder 9 also supports adjustably a member 20 the lower portion of which extends below the end of the tool 7 with its forward face spaced rearwardly from the forward cutting edge of the tool at a distance and on an angle corresponding to the width and taper of the nail blank which is to be cut. The member 20 thus acts as a stop for the strip of metal 21 in its forward feeding movement.

The cams 18 and 19 are shaped to move the holders 9 and 10 downwardly, at first in unison, with the cutting edges of the tools 7 and 8 in the same horizontal line during the cutting operation. Mounted in a holder 22 on a laterally extending bracket 23 is a flexible metal rod 24 which is arranged to bear upwardly and forwardly with its free end normally below the lower end of the tool 8 and in position to contact with the lower side of one end portion of the nail blank as the latter is severed from the strip. Subsequent to the cutting operation the tool 8 continues to move downwardly, through the action of the cam 19, past the lower limit of movement of the tool 7, and thereby springs the rod 24 downwardly with the nail blank held firmly between the tool and the rod, these elements thus constituting the first carrying mechanism for conveying the blank into proper position for the heading operation. In order to free the rod 24 from contact with the nail blank before the operation of the heading tool and permit it to return to its former position, there is provided a lever 25 which is pivoted to the side of the block 10 and is operated by a cam 26 on the shaft 4 so as to impart lateral movement to the rod. The lever 25 engages the rod 24 from the front and pushes it back away from the nail when actuated by the cam, after the nail has been carried down and gripped in the heading dies about to be described. An adjustable stop 27 limits the upward movement of the rod and determines its normal position.

Both the heading and the finishing operations are performed by the aid of dies the construction of which in the preferred embodiment shown includes the provision of complementary recesses in the opposed faces of die blocks 28 and 29, the upper recesses pertaining to the heading die and the lower to the finishing die. The die block 28 is mounted adjustably in the forward portion 6 of the frame, and the block 29 is carried by a member 30, Fig. 4, which rocks about adjustable pivots 31 and 32 in the frame. The member 30 has projecting upwardly therefrom an arm 33 which is held in contact with a cam 34 on the shaft by means of a spring 35 secured to the rear portion of the frame and connected with the arm 33 by a rod 36. This cam and the spring 35 serve to effect rocking movement of the member 30 so as to move the die block 29 alternately toward and away from the block 28. A distance piece 37 is adjustably secured to the arm 33 by a screw 38 and serves to adjust the limit of movement of the die block 29 with reference to the block 28.

Coöperating with the heading die is a heading punch 39 which is carried by a block 40 pivotally mounted in the frame as shown at 41. The block 40 has rocking movement imparted thereto by means of a link 42 which connects the block with a crank pin 43, so that the punch on the upward rocking movement of the block is caused to approach the die and form a head upon the nail blank. The end of the punch is formed with a recess 44 so as to round the head slightly at the edges. The punch or header is held in position on the block by set screws 45, 46 and 47. The screws 45 and 46 bear respectively upon the end and the side of the header, and the screw 47 forces an extended bearing block 48 upon the header from above. It will be evident that with this construction the header may be adjusted both sidewise and endwise to place it in proper position to coöperate effectively with the die, and the set screws serve to hold it firmly in place.

The metal strip 21 from which successive nail blanks are automatically cut is of a width equal to the length of the nail blank desired and is fed to the cutting devices between adjustable guides 49 and 50. The nail strip passes through a holder 51 in the form of a tube, which carries at its inner end an extension 52 provided with a slot that receives the end of the strip. This holder is rotatably supported by a species of ball and socket connection upon a post 53 near the end of a bracket 54 projecting from the frame, and the extension 52 at the inner end of the holder has a bearing upon the plate 5. The bracket 54 is adjustable as shown so that the holder may be set at a slight angle with reference to the cutting tools when it is desired to form a tapered nail blank. In forming tapered nails also it is desirable to turn the strip 21 through a half revolution about its longitudinal axis after each blank is cut therefrom in order to utilize the bevel left on the end of the strip as a taper in reverse position for the next blank and bring the wider end of the blank always opposite to the heading punch. Mechanism is therefore provided for oscillating the holder so as to reverse the position of the strip between successive cutting operations. This mechanism comprises a gear 55 on the main shaft which meshes with a gear 56 having twice the number of teeth of the gear 55. Journaled in the rear of the frame is a rock shaft 57 which has two arms 58 and 59. The arm 58 is pivotally connected to a link 60 which is pivoted to an adjustable pin on the side of the gear wheel 56. The shaft 57 is thus rocked twice for each revolution of the wheel 56, or once for each revolution of the main shaft. To the arm 59 is pivotally connected one end of a reciprocating rod 61 which extends forwardly as shown in Fig. 1 and rests upon a pin 62 carried by a substantially U-shaped member 63. This member is mounted for oscillatory movement upon the bracket 54, and is arranged to be operatively connected with the rod 61 by engagement of the pin 62 between a collar 64 on the rod and the end of a lever 65 which is pivotally mounted on a collar 66 on the rod. A spring catch 67 is arranged to hold the lever either in position to engage the pin or in inoperative position, as shown in Fig. 1, where movement of the rod 61 has no effect upon the member 63 and feeding of the nail strip is discontinued. This illustrates the position of the parts when it is necessary to insert a new strip in the tube. The member 63 has rigid arms 68 and 69 projecting in opposite directions therefrom, and flexible straps 70 and 71 are connected with these respective arms and are arranged to wind upon the holder 51 in opposite directions. With this arrangement movement of the rocking device including the member 63 and the arms 68 and 69 serves to unwind one of the straps and to wind correspondingly the other strap upon the holder, thereby turning the holder through 180° in one direction or the other depending upon the direction of movement of the device. A spring 72 bears downwardly upon the holder so as to keep the extension 52 in contact with the plate 5. The metal strip 21 is fed forwardly against the stop 20 by means of a follower 73 which enters the holder 51 and is operated by a weight 74 and a cord 75 in a manner common in the art.

The guide 49 is formed with a slot through which passes a clamping screw 76 to hold the guide rigidly in position upon the upper face of the part 6 of the frame. This guide is at that side of the machine adjacent to the heading punch and serves to determine the position of the metal strip with reference to the side of the die so as to insure that a proper extent of the nail blank shall project from the die to be subjected to the action of the header. By loosening the screw 76 the guide may be adjusted for the purpose of varying the extent of the blank to be used in forming the nail head. The guide 50 on the opposite side is in the form of a spring arm, and its function is to bear constantly upon the metal strip so as to force it into engagement with the guide 49. The guide 50 is mounted in a holder 77 and held therein by a set screw 78. The holder 77 is formed with a slot similar to the slot in the guide 49 and is adjustable in a similar manner and held in adjusted position by a screw 79. A screw 80 is threaded through the holder and bears upon the frame portion 6 so as to adjust the elevation of the guide 50.

The heading and finishing dies are made somewhat shorter than the length of the nail blank so that a portion of the blank may be left projecting in position to be grasped by mechanism that is suitably operated to carry the blank from the heading die to the finishing die and to remove the finished nail from the latter die. This mechanism comprises two pairs of fingers 81, 82 and 83, 84, which perform respectively the two operations referred to. The fingers 81 and 83 are, in the machine shown, formed by a single bifurcated piece of metal, as are also the fingers 82 and 84. See Fig. 8. Each of the fingers 81 and 83 has a score or notch formed therein as shown in Fig. 8, so as to position the nail properly, and the opposed fingers 83 and 84 have their faces hollowed out, as shown, so as to limit the extent of contact of the fingers with the nail and avoid any tendency of the nail to stick to the fingers when finally released. The fingers are clamped adjustably in the ends of holders 85 and 86 which are formed of spring metal and are secured in a block 87 on opposite sides of a distance piece 88, so that the fingers are normally separated. Closing movement of the fingers is effected by means of a slide 89 which has projections 90 that engage lugs 91 on the fingers. The slide carries side plates 92 which are joined by a block 93, the latter having attached thereto a plate 94 that rests upon the holders 85 and 86 and prevents downward movement of one end of the slide 89 with respect to the holders. A spring 95 attached at one end to a pin 96 in the slide and at its other end to the block 87 serves to move the slide toward the left, as seen in Fig. 6, and to permit opening of the fingers. Movement of the slide in the opposite direction is effected by means of a lever 97 pivoted at 98 to a bracket 99 on the frame and operated at the proper time by a face cam 100 on the cam wheel 101. The lower end of the lever is connected with the end of the slide by a pin 102 the ends of which are seated loosely in sockets that are formed respectively in the end of the slide and in an adjustable screw 103 carried by the lever. This form of connection permits the block 87 and the holders to move in different directions as will be subsequently explained.

The finishing die, as shown in Fig. 18, includes similar opposed recesses 104 in the faces of the die blocks for receiving and holding the shank of the nail and enlarged recesses 105, concentric with the recesses 104, in which the head of the nail is received for the finishing operation. This construction assures accurate centering of the head with reference to the shank. Since, in the preferred construction shown, the sides of the die blocks adjacent to the heading punch are formed with plane faces, it is necessary to move the nail slightly endwise as it is carried from the heading die to the finishing die, in order that the head may be fully received within the enlarged recess of the latter die. The dies are arranged to perform their operations simultaneously, so that while a nail head is in process of compression in the finishing die a blank is held in the heading die in position for the action of the header. The fingers are arranged likewise to perform their operations upon both nails simultaneously, and therefore close upon the projecting shanks of both nails while the latter are in the positions above mentioned. As the dies open it is desirable to impart to the nails first a sidewise movement to free them from the scores in the stationary block 28. This is, therefore, the first movement of the fingers. The fingers next move downwardly and toward the left as seen in Fig. 6, so as to bring the headed nail into position to enter the finishing die. The third movement is a sidewise movement in a direction opposite to that of the first movement to seat the headed nail in that portion of the finishing die formed in the die block 28 in the position shown in Fig. 18. The dies then close to perform their respective operations, and during the compressing operation of the dies, the fingers hold the shanks of the nails in such relation to the dies as to insure accurate centering of the head with reference to the shank. Previous to the closing of the dies another blank is carried to the heading die in the manner already explained. After the dies have closed the fingers open and move upwardly to their first position.

For effecting the above described movements of the fingers the block 87 is pivotally suspended on a hanger 106 which is pivoted at 107 in a holder 108, the latter being pivoted on a vertical axis at 109 to the bracket 99. Connected pivotally with the hanger 106 at the points of suspension of the block 87 is a yoke 110 which is connected by means including an adjustable turnbuckle 111 with an arm 112 on a bell crank lever 113 which is pivoted at 114 to the bracket 99. An arm 115 on this lever is connected with the block 93 by means of a rod 116 the ends of which are seated in sockets formed respectively in the block and in the end of an adjustable screw 117 on the arm. The rod is retained in position by pins 118 and 119 and thus forms a means of suspension and a positioning means for the forward portion of the holders 85, and 86 and the slide 89, while permitting lateral and endwise movement of these elements with respect to the lever 113. The yoke 110 and its connections perform, it will be noted, a similar function for the rear end portions of the elements mentioned. Springs 120 and 121 tend to maintain the finger carrying elements normally in their uppermost position. The lever 113 is operated at the proper time by a face cam 122 on the wheel 101. This serves to depress both the rod 116 and the yoke 110 so as to move the fingers downwardly, and since the hanger 106 swings about the pivot 107 a slight movement toward the left, as seen in Fig. 6, will also be imparted to the fingers. This will bring the nail head opposite the recess in the finishing die in the manner previously mentioned. The rod 116 and the yoke 110 and their connections are suitably proportioned and adjusted to maintain the substantially horizontal disposition of the holders 85 and 86 during the movement thereof.

Lateral movement of the fingers in one direction is effected by means of a lever 123 which is operated by a suitable cam on the periphery of the wheel 101 and is pivoted in a bearing 124 on the bracket 99. The lower end of this lever carries an adjustable screw 125 that contacts with the plate 92 and serves, on operation of the lever 123 by its cam, to swing the fingers and their holders about the pivot 109. Movement in the opposite direction is imparted to these elements by a spring 126 (Fig. 5) connected respectively to a bracket 127 on the frame of the machine and to the slide 89. The spring thus tends to maintain the fingers at their limit of lateral movement toward the portion 6 of the frame, and the screw 125 which determines this limit is suitably adjusted to position the fingers in proper coöperative relation to the dies.

In the operation of the machine a metal strip is first placed in the holder in position to contact with the stop 20, and the follower 73 is placed in contact with the outer end of the strip and connected with the weight 74. The operation of the main shaft serves to move the cutting tools in the manner previously described so as to sever a nail blank from the strip, and the continued downward movement of the tool 8 in conjunction with the bearer 24, as shown in Figs. 10 and 11, serves to carry the blank to the level of the first or heading die. The movable die block is now operated by the cam 34, thus closing the dies and gripping the nail blank in the scores or recesses in the heading die as shown in Fig. 12, this operation serving to impress that portion of the shank adjacent to the head end with the form desired. The cutting tools 7 and 8 now recede through the operation of the springs 16 and 17, and the lever 25 is operated by the cam 26 so as to move the bearer 24 laterally and free it from contact with the nail blank, thereby permitting it to follow the tool 8 upwardly. The block 40 is rocked at this point and forces the end of the header 39 against the end of the nail blank so as to form or swage a head thereon, this stage of the operation being represented by Fig. 13. The fingers 81 and 82, which are open at this point, are now closed through the operation of the lever 97, and as the header recedes and the dies open, the lever 123 imparts a lateral movement to the fingers to free the nail from the score in the stationary die block. Following this movement the lever 113 is operated by its cam to depress the fingers, thereby carrying the nail to the level of the second or finishing die, the fingers having imparted to them at this time by the connections previously described a slight endwise movement so as to bring the nail head in proper position to enter the enlarged recess in the die. The lever 123 is now released by its cam and the spring 126 imparts a lateral movement to the fingers in a direction opposite to that of their previous lateral movement so as to bring the nail into proper relation to the recess in the stationary die block. In the meantime another blank has been cut and brought down to the level of the heading die. The dies now close again, and while operating upon the new blank compress the head and adjacent portions of the shank of the headed nail to remove irregularities and give the nail substantially the final shape desired. As soon as the nail is seized by the finishing die the cam 100 ceases to act upon the lever 97, and the spring 95 moves the slide 89 so as to permit the fingers to open. The cam 122 now ceases to act upon the lever 113 and the springs 120 and 121 move the fingers upwardly to their first position.

It will be understood that during the subsequent operation of the machine the fingers 83, 84 come into play and close upon the shank of the nail that is seated in the finishing die at the same time that the other fingers seize the nail that is seated in the heading die, as represented in Fig. 15. These fingers serve, during their lateral and downward movements, to remove the finished nail from the finishing die, and when finally opened release the nail and permit it to drop, as shown in Fig. 17, into a suitable chute or receptacle.

Although I have described the invention as embodied in a machine having the specific features of construction shown and described, it will be understood that the invention is not limited thereto but that various other embodiments are comprehended within the spirit and scope of the appended claims.

Having described my invention, what I claim as new and desire to secure by Letters Patent of the United States is the following:

1. In a nail making machine, means for detaching a nail from a blank, means for heading the nail, nail finishing means comprising, in combination, mechanism for compressing the nail head to reduce the head to the shape and size desired, and means for moving the headed nail transversely to present it in suitable position to receive the compressing action of said mechanism.

2. In a nail making machine, in combination, means for heading a nail, nail finishing means for pressing upon the sides of the nail head to reduce the head to the shape and size desired, means for moving the nail out of operative relation to the heading means and into operative relation to the finishing means and constructed and arranged to hold the shank of the nail during said compressing operation in such relation to said mechanism as to insure accurate centering of the head with reference to the shank.

3. In a nail making machine, the combination with means for forming a head upon a nail blank, of means for finishing the nail so formed comprising mechanism for bringing pressure to bear upon the sides of the nail head to remove irregularities incident to the heading operation, and means for moving the nail out of operative relation to the head forming means and into operative relation to the finishing means and constructed and arranged to present the nail subsequent to said head forming operation in suitable position to receive the action of said finishing means.

4. In a nail making machine, the combination with means for forming a nail from a nail blank comprising a die for forming the shank and a punch arranged to operate upon the end of the blank to form a head thereon, of finishing means comprising mechanism for pressing upon the sides of the nail head to remove irregularities incident to the heading operation, and means for moving the nail out of operative relation to said punch and into operative relation to the finishing means and constructed and arranged to present the nail subsequent to said heading operation in suitable position to receive the action of said finishing means.

5. In a nail making machine, the combination with means for forming a head upon a nail blank, of means for finishing the nail so formed comprising a two-part die constructed to compress the nail head to the shape and size desired, means for operating said die, and means for grasping and carrying a nail from said forming means and presenting it in suitable position to receive the compressing action of said die.

6. In a nail making machine, the combination with means for forming a head upon a nail blank, of means constructed to press upon the sides of the nail head for finishing the nail so formed, said finishing means being arranged in predetermined relation to said forming means and comprising a two-part die, and means for grasping the shank of the nail formed in said first mentioned means and presenting said nail in suitable position to receive the compressing action of said die.

7. In a nail making machine, the combination with means for forming a head upon a nail blank and for shaping the shank of the nail adjacent to the head, comprising a two-part die and a heading punch, of finishing means comprising a two-part die constructed to press upon the sides of the nail head to remove irregularities incident to the heading operation, said finishing means being arranged in predetermined relation to said forming means, and means for grasping a portion of the shank that has not been operated upon in said first mentioned means and presenting the nail in suitable position to receive the compressing action of said finishing die.

8. In a nail making machine, the combination with means for forming a head upon a nail blank, of means for finishing the nail so formed, and means for carrying a headed nail from the forming means to the finishing means comprising a pair of fingers constructed to grasp the shank of the nail, and means for opening and closing said fingers and for imparting thereto lateral, downward and endwise movements.

9. A nail making machine having, in combination, coöperating die blocks the opposed faces of which are formed with scores for receiving a nail blank during the heading operation, said faces having also below said scores other complementary recesses for receiving the shank of the nail in a subsequent finishing operation, said recesses being enlarged at one end to provide a cavity for the reception of the nail head, means for forming a head upon the blank while the latter is held in said scores of the die blocks, a pair of fingers constructed to grasp the nail and carry it downward from said heading means to said finishing means, and means for imparting to said fingers endwise movement during the downward movement thereof to bring the head of the nail into position to be received in said cavity of the die.

10. In a nail making machine, the combination with means for forming a head upon a nail blank, of means for finishing the nail so formed, and means for carrying a headed nail from the forming means to the finishing means comprising a pair of fingers, means for opening and closing said fingers, a lever suitably operated for imparting downward movement to said fingers, and connections between said lever and fingers arranged to impart to said fingers endwise movement during the downward movement thereof.

11. In a nail making machine, coöperating die blocks the opposed faces of which are formed with scores for receiving a nail blank during the heading operation, said faces having also recesses for receiving the shank of the headed nail in a subsequent finishing operation, said recesses being enlarged at one end to provide a cavity for the reception of the nail head, means for carrying a nail from said scores in the die blocks to a position between said recesses, and means for closing the die to form the nail by lateral pressure in said recesses.

12. In a nail making machine, the combination with means for forming a head upon a nail blank, of nail head finishing means comprising a pair of relatively movable die blocks for subjecting the sides of the head to lateral pressure, said die blocks having recessed portions formed to receive and operate upon the sides of the nail head, and means for grasping and carrying the nail from said head forming means to said finishing means, said carrying means being constructed and arranged to present the nail with its head between said recessed portions of the die blocks.

13. In a nail making machine, the combination with means for forming a head upon a nail blank, of nail head finishing means comprising a pair of relatively movable die blocks for finishing the head by lateral pressure, said die blocks having recessed portions formed to receive and operate upon the nail head, fingers for grasping the shank of the nail to carry the nail from said head forming means to said finishing means, and mechanism for operating said fingers to cause the head of the nail to be presented between said recessed portions of the die blocks.

In testimony whereof I have signed my name to this specification in the presence of two subscribing witnesses.

HARRISON H. EATON.

Witnesses:
CHESTER E. ROGERS,
ABBIE L. FREAR.

Copies of this patent may be obtained for five cents each, by addressing the "Commissioner of Patents, Washington, D. C."